United States Patent
Haggerty

(10) Patent No.: US 11,770,000 B2
(45) Date of Patent: Sep. 26, 2023

(54) INPUT VOLTAGE LIMITER FOR A MICROCONTROLLER

(71) Applicant: Continental Automotive Systems, Inc., Auburn Hills, MI (US)

(72) Inventor: Michael A. Haggerty, Grand Blanc, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 106 days.

(21) Appl. No.: 17/416,423

(22) PCT Filed: Dec. 21, 2019

(86) PCT No.: PCT/WO2019/068199
§ 371 (c)(1),
(2) Date: Jun. 18, 2021

(87) PCT Pub. No.: WO2020/139787
PCT Pub. Date: Jul. 2, 2020

(65) Prior Publication Data
US 2022/0077680 A1    Mar. 10, 2022

Related U.S. Application Data

(60) Provisional application No. 62/785,779, filed on Dec. 28, 2018.

(51) Int. Cl.
*H02H 9/04* (2006.01)
(52) U.S. Cl.
CPC .................................. *H02H 9/046* (2013.01)

(58) Field of Classification Search
CPC ......................................................... H02H 9/046
See application file for complete search history.

(56) References Cited

U.S. PATENT DOCUMENTS

| | | | | |
|---|---|---|---|---|
| 5,291,365 A | * | 3/1994 | Takagi | G05F 1/569 |
| | | | | 361/91.6 |
| 2009/0034139 A1 | | 2/2009 | Martin | |
| 2009/0262478 A1 | | 10/2009 | Popescu-Stanesti et al. | |
| 2015/0092312 A1 | * | 4/2015 | Govindarajan | H02H 9/005 |
| | | | | 361/111 |
| 2020/0059085 A1 | * | 2/2020 | Kolli | H02H 7/0833 |

FOREIGN PATENT DOCUMENTS

| | | | | |
|---|---|---|---|---|
| DE | 102014113715 A1 | * | 4/2015 | ............. H02H 3/087 |
| EP | 0709961 A2 | | 5/1996 | |
| EP | 3367568 A1 | * | 8/2018 | ............. B60R 16/03 |
| FR | 2941101 A1 | | 7/2010 | |
| JP | 5291365 B2 | * | 9/2013 | |

OTHER PUBLICATIONS

International Search Report and Written Opinion dated Apr. 20, 2020 from corresponding International Patent Application No. PCT/US2019/068199.

* cited by examiner

Primary Examiner — Dharti H Patel

(57) ABSTRACT

An electronic control unit includes a microcontroller. The microcontroller includes a power supply pin configured to receive power and at least one input/output (I/O) pin. A voltage regulator includes a power input configured to connect to a power source and to a regulated power output connected to the power supply pin via an I/O fault protection circuit.

14 Claims, 4 Drawing Sheets

INPUT VOLTAGE LIMITER FOR A MICROCONTROLLER

TECHNICAL FIELD

The present disclosure relates generally to electrical protection circuit for microcontrollers, and more specifically to a circuit for limiting an input voltage to a microcontroller during a low power mode of operations.

CROSS-REFERENCE TO RELATED APPLICATION

This application claims priority to U.S. Provisional Application No. 62/785,779 dated Dec. 28, 2018.

BACKGROUND

Some electronic control units utilize a microcontroller that receives power from a regulated voltage supply. The regulated voltage supply in such examples may be subjected to voltage spikes due to short circuits or transient events which can cause the connected microcontroller to be subjected to voltage potentials higher than the regulated voltage supply. The higher voltage can lead to undesirable operation or damage to the microcontroller.

Some existing systems have attempted to solve the uncontrolled voltage increase by placing a Zener diode at each input to the microcontroller where the current injection is likely to occur. This solution results in a substantial increase in cost in systems where multiple inputs may be subject to injections as each input requires its own Zener diode. Some alternate systems have attempted to solve the current injection by placing a Zener diode at the power supply pin of the microcontroller. However, placing a Zener diode at the power supply pin results in substantial reverse leakage that is not acceptable for certain applications.

SUMMARY OF TILE INVENTION

Figure 1:
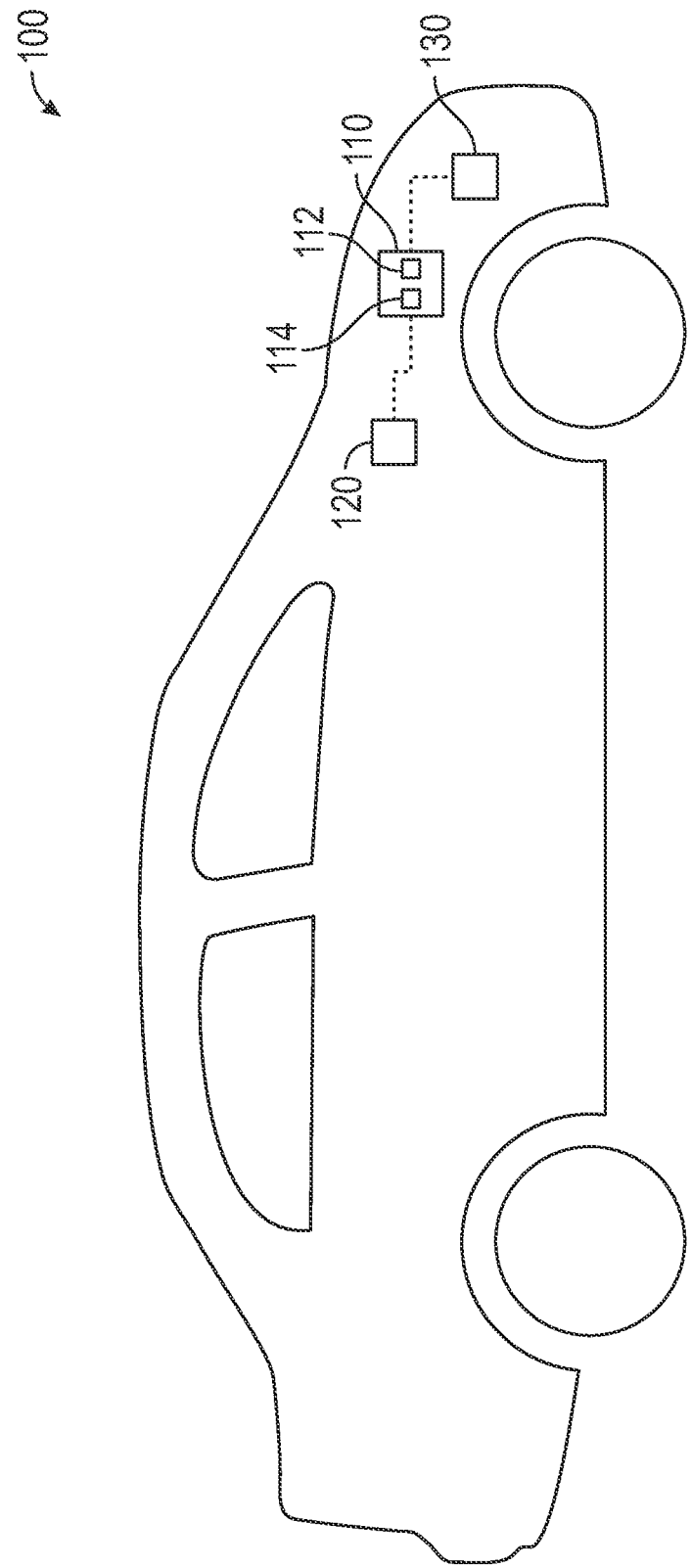
FIG. 1 schematically illustrates an exemplary vehicle including an electronic control system and a power source.

In one exemplary embodiment an electronic control unit includes a microcontroller having a power supply pin configured to receive power and at least one input/output (I/O) pin, and a voltage regulator including a power input configured to connect to a power source, and a regulated power output connected to the power supply pin via an I/O fault protection circuit.

In another example of the above described electronic control unit the I/O fault protection circuit comprises a common collector transistor having an emitter connected to the power supply pin and a collector connected to a ground.

In another example of any of the above described electronic control units a base of the common collector transistor is connected to the regulated power output of the voltage regulator.

Another example of any of the above described electronic control units further includes a second transistor connecting the regulated power output of the voltage regulator to the emitter of the common collector transistor.

In another example of any of the above described electronic control units the second transistor is a MOSFET.

Another example of any of the above described electronic control units further includes a body diode connected across the second transistor.

In another example of any of the above described electronic control units the MOSFET is configured to be on during high power operations and off during low power operations.

In another example of any of the above described electronic control units the I/O fault protection circuit is contained within the electronic control unit.

In another example of any of the above described electronic control units the I/O fault protection circuit is external to the electronic control unit.

In another example of any of the above described electronic control units the I/O fault protection circuit comprises a common collector transistor having an emitter connected to the power supply pin and a collector connected to a ground and a Schottky diode connecting the regulated power output of the voltage regulator to the emitter of the common collector transistor.

In another example of any of the above described electronic control units the I/O fault protection circuit is configured to limit a voltage at a microcontroller to at most a first quantity, the quantity being a sum of a regulator output voltage (VCC) and a forward voltage drop of a Schottky diode.

In another example of any of the above described electronic control units the I/O fault protection circuit is configured to limit a voltage at a microcontroller to at most a first quantity, the quantity being a sum of a regulator output voltage (VCC) and an emitter-base forward voltage (VEB) of a common-collector PNP transistor acting in an active mode.

An exemplary method for protecting an electronic control unit includes engaging a protection circuit in response to an electrical control unit entering a lower power mode of operations, wherein engaging the protection circuit comprises allowing excess charge at a voltage regulator output to be sunk to ground through a PNP transistor in response to an occurrence of a short circuit at at least one input/output pin of a protected microcontroller.

In another example of the above described exemplary method for protecting an electronic control unit operating the protection circuit while the electronic control unit is in a low power mode of operations comprises switching off a MOSFET transistor connecting a power output of a voltage regulator to a power input pin of a microcontroller.

Another example of any of the above described exemplary methods for protecting an electronic control unit further include disengaging the protection circuit in response to the electrical control unit entering a high power mode of operations.

In another example of any of the above described exemplary methods for protecting an electronic control unit the high power mode of operations is and active control mode.

In another example of any of the above described exemplary methods for protecting an electronic control unit engaging the protection circuit protects a plurality of input/output (I/O) pins of the electronic control unit.

These and other features of the present invention can be best understood from the following specification and drawings, the following of which is a brief description.

DETAILED DESCRIPTION

FIG. 1 schematically illustrates a vehicle 100. Included within the vehicle 100 is at least one electrical control unit 110. The electrical control unit 110 is configured to control a corresponding vehicle system 120 using an internal microcontroller 114. The vehicle system 120 can include any controlled vehicle system, and is not limited to a particular example system. Also connected to, and powering, the electrical control unit 110 is a power source 130. The power source 130 can be any vehicle power source including a vehicle battery. The power source 130 is connected to the electrical control unit 110 via an input/output (I/O) pin 112

In some events a short circuit to the power source 130 is inadvertently induced at an I/O (Input/Output) pin 112. When such an event occurs, the short circuit can interface with the microcontroller 114 in the electronic control unit 110 while the microcontroller 114 is in a "sleep" mode, or other low-power mode of operation. The interfacing during a low power mode of operations causes a current to be injected into a regulated power supply powering that microcontroller 114 through body diodes of the input structure of the microcontroller 114. The injected current causes the voltage of the regulated power source 130 to rise uncontrollably when the magnitude of the injected current exceeds the magnitude of current consumed by the circuits which are powered from the regulated power supply. This excess current can cause the microcontroller 114 to experience voltages at the power supply input 112 which exceed the specified limits of the microcontroller 114, potentially damaging the microcontroller 114, or otherwise impairing operations of the electrical control unit 110.

Figure 2:
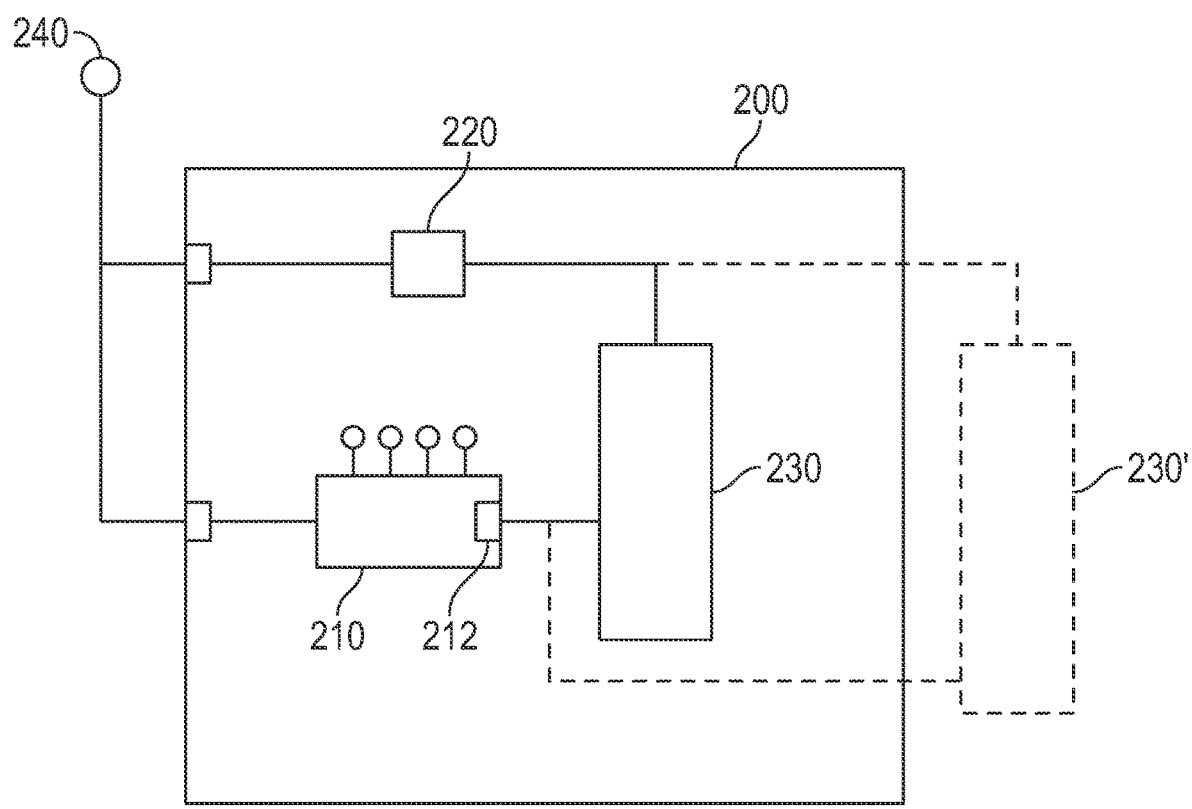
FIG. 2 illustrates an exemplary electrical control unit including a circuit providing protection for a microcontroller in a low power mode of operations.

With continued reference to FIG. 1, FIG. 2 schematically illustrates an exemplary electrical control unit 200 including a microcontroller 210 a voltage regulator 220, and an I/O fault protection circuit 230 (referred to in shortened form as a protection circuit 230). In alternative examples, the protection circuit 230 can be replaced with an externally housed protection circuit 230' that is connected to the microcontroller in the same manner as the internal protection circuit 230. The alternative protection circuit 230' is illustrated via dashed lines in FIG. 2, and functions in substantially the same manner, including the same connections, as the internal protection circuit 230.

The protection circuit 230 is connected to power supply pins 212 of the microcontroller 210 and protects against an uncontrolled voltage from an uncontrolled voltage increase from a regulated power supply, such as a battery, connected to a power input 240.

The protection circuit 230, 230' protects against the uncontrolled voltage increase by regulating a voltage at the microcontroller 210 to a predetermined level. The predetermined level is a function of a voltage output of the regulator 220 and an emitter-base forward voltage of a transistor or other electronic component internal to the protection circuit 230, while the transistor or other electronic component is operating in an active mode.

Figure 3:
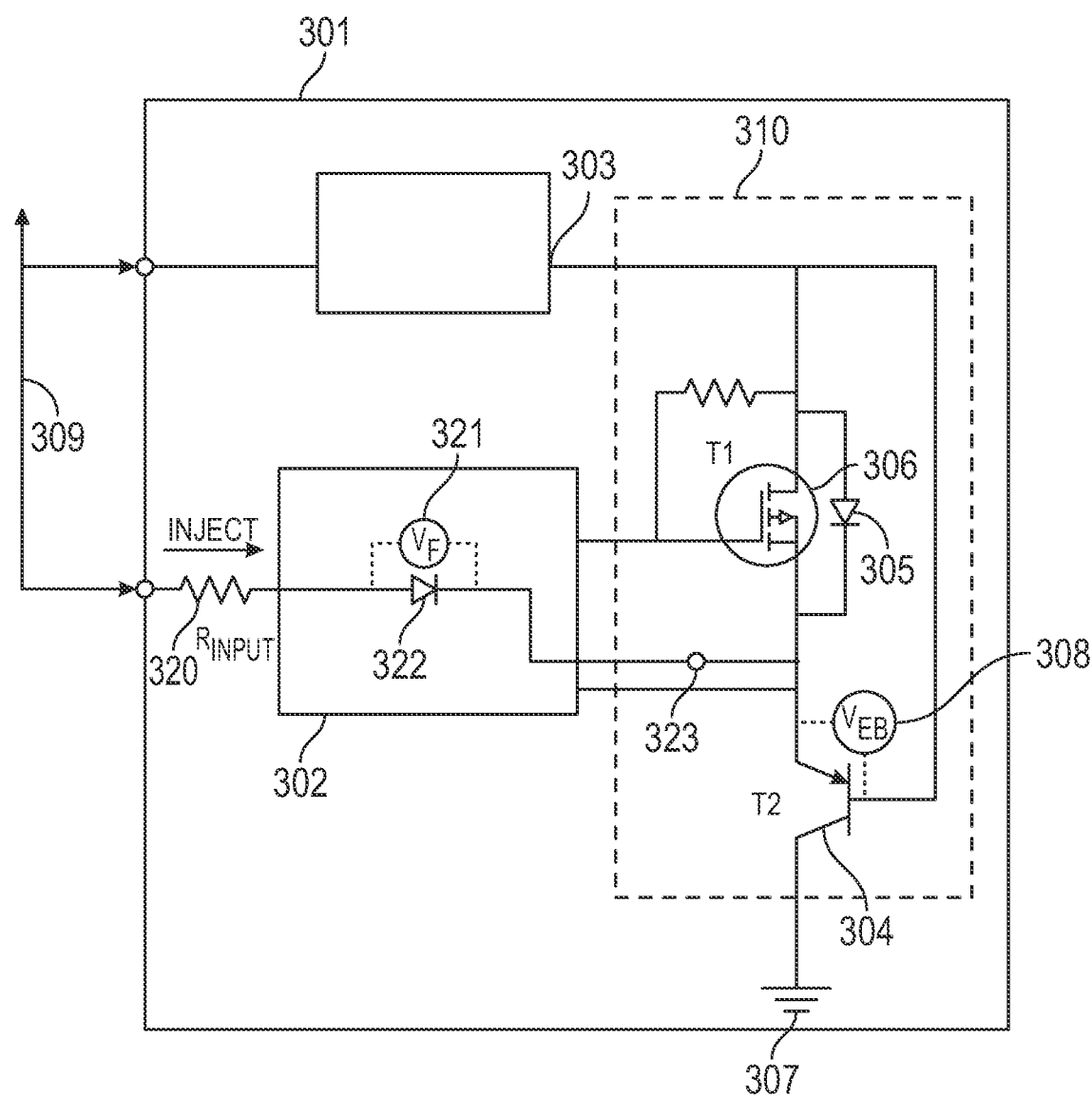
FIG. 3 schematically illustrates a more detailed electrical control unit of FIG. 2, including the protection circuit.
Figure 4:
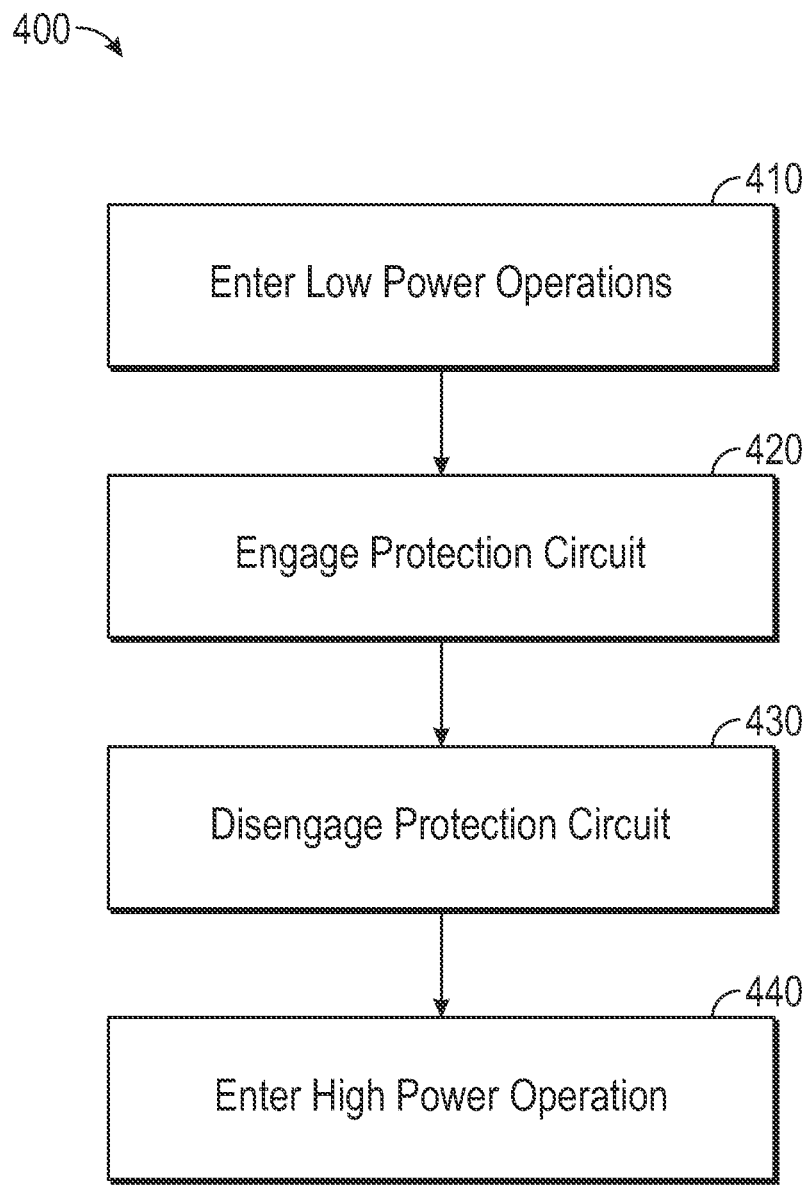
FIG. 4 illustrates a method of operating the protection circuit of FIGS. 2 and 3.

With continued reference to FIGS. 1 and 2, FIG. 3 illustrates a more detailed example electrical control unit 301 according to the general schematic of FIG. 2. In the event that a short to battery is present on an Input/Output 309 (I/O) of the electronic control unit 301, a body diode 305 of a P-channel MOSFET 306 blocks charge from flowing back into the regulator output 303 (referred to as VCC) and the voltage at the microcontroller 302 supply begins to rise. While illustrated as a single I/O pin 309, it is appreciated that the microcontroller 302 can include any number of I/O pins subject to the same input fault.

As the voltage at the microcontroller 302 approaches the sum of VCC+VEB (the sum of the regulator output 303 VCC and an emitter-base bias 308 of the transistor 304), the PNP transistor 304 begins to turn on, and excess charge is carried through a base region of the PNP transistor 304 into the collector, which is connected to ground 307. This circuit path prevents the supply voltage of the microcontroller 302 from rising above a maximum rating, and mitigates a risk of device damage. During the non-sleep or normal operating mode of the electronic control unit 301 (i.e. any non-low power mode), the P-channel MOSFET 306, which is controlled by the microcontroller 302, is turned on (switched closed). By turning the P-channel MOSFET 306 on, the voltage drop between the regulator output and the supply input of the microcontroller is minimized, based on the RDS(on) of the P-channel MOSFET 306 and the total supply current necessary to power the microcontroller 302.

During operation of the protection circuit 310 an input circuit 320, modeled as a simple resistor inside the electronic control unit 301, is connected externally to the battery potential I/O 309 due to a fault in the electrical system. This represents an undesirable fault condition. This short circuit results in a current, $I_{inject}$, which is a function of the resistance $R_{input}$ of the input circuit 320 and the forward voltage drop 321 (VF) of a body diode 322 inside the input structure of the microcontroller 302. This current is blocked from flowing into the output 303 of the voltage regulator VCC by a body diode 305 of a deactivated P-channel MOSFET 306 in the protection circuit 310. As the charge continues to build up at a node 323 (referred to as \Atm)), the voltage continues to rise. Once the voltage reaches the sum of the regulator output and the emitter-base bias, VCC+VEB, the PNP transistor 304 turns on and excess charge is sunk to ground 307. By sinking the excess charge to ground, the power supply potential at the node 323 (VMicro) is limited to VCC+VEB. The sum of VCC VEB is designed during the initial design of the system to be at a safe level (i.e. within the maximum voltage range of the particular microcontroller used).

With continued reference to FIGS. 3, it is contemplated that the P-channel MOSFET 306 could, in some examples, be replaced with a Schottky diode when no ratiometric A/D conversions are required. This is possible since the larger forward voltage drop of the Schottky diode (as compared to VDS of the P-channel MOSFET 306, determined by the RDS(on) of the device and the maximum current drawn by the microcontroller 302) will cause a fluctuation in the A/D converter reference voltage which may be negligible.

With continued reference to FIGS. 1-3, FIG. 4 illustrates a method for operating the protection circuit, and particularly the protection circuit of FIG. 3. While the electrical control unit is actively controlling the corresponding vehicle system, the electrical control unit is operated in a high power mode, and the protection circuit is disengaged. When the corresponding vehicle system no longer needs to be powered, the electrical control unit enters low power operations, or sleep mode, in an "Enter Low Power Operations" step 410. Immediately after entering the low power operations mode 410, the transistor (or other similar component) within the protection circuit is switched to an open state, thereby engaging the protection circuit in an "Engage Protection Circuit" step 420. The protection circuit remains engaged for a duration of the low power, or sleep, mode.

When the electrical control unit is needed to control the corresponding vehicle system again, the protection circuit is disengaged by closing the transistor, or other similar component in a "Disengage Protection Circuit" step 430. Immediately following disengaging the protection circuit, the electrical control unit begins actively control the corresponding vehicle system in an "Enter High Power Operations" step 440.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An electronic control unit comprising:
   a microcontroller having a power supply pin configured to receive power and at least one input/output (I/O) pin;
   a voltage regulator including a power input configured to connect to a power source, and a regulated power output connected to the power supply pin via an I/O fault protection circuit, wherein the I/O fault protection circuit comprises a common collector transistor having an emitter connected to the power supply pin and a collector connected to a ground; and
   a second transistor connecting the regulated power output of the voltage regulator to the emitter of the common collector transistor.

2. The electronic control unit of claim 1, wherein a base of the common collector transistor is connected to the regulated power output of the voltage regulator.

3. The electronic control unit of claim 1, wherein the second transistor is a MOSFET.

4. The electronic control unit of claim 3, wherein the MOSFET is configured to be on during high power operations and off during low power operations.

5. The electronic control unit of claim 1, further comprising a body diode connected across the second transistor.

6. The electronic control unit of claim 1, wherein the I/O fault protection circuit is contained within the electronic control unit.

7. The electronic control unit of claim 1, wherein the I/O fault protection circuit is external to the electronic control unit.

8. The electronic control unit of claim 1, wherein the I/O fault protection circuit comprises a common collector transistor having an emitter connected to the power supply pin and a collector connected to a ground and a Schottky diode connecting the regulated power output of the voltage regulator to the emitter of the common collector transistor.

9. The electronic control unit of claim 8, wherein the I/O fault protection circuit is configured to limit a voltage at a microcontroller to at most a first quantity, the quantity being a sum of a regulator output voltage (VCC) and a forward voltage drop of a Schottky diode.

10. The electronic control unit of claim 1, wherein the I/O fault protection circuit is configured to limit a voltage at a microcontroller to at most a first quantity, the quantity being a sum of a regulator output voltage (VCC) and an emitter-base forward voltage (VEB) of a common-collector PNP transistor acting in an active mode.

11. A method for protecting an electronic control unit comprising:
    engaging a protection circuit in response to an electrical control unit entering a lower power mode of operations, wherein engaging the protection circuit comprises allowing excess charge at a voltage regulator output to be sunk to ground through a PNP transistor in response to an occurrence of a short circuit at at least one input/output pin of a protected microcontroller;
    wherein operating the protection circuit while the electronic control unit is in a low power mode of operations comprises switching off a MOSFET transistor connecting a power output of a voltage regulator to a power input pin of a microcontroller.

12. The method of claim 11, further comprising disengaging the protection circuit in response to the electrical control unit entering a high power mode of operations.

13. The method of claim 12, wherein the high power mode of operations is and active control mode.

14. The method of claim 11, wherein engaging the protection circuit protects a plurality of input/output (I/O) pins of the electronic control unit.

\* \* \* \* \*